(12) United States Patent
Hashimoto et al.

(10) Patent No.: US 10,279,629 B2
(45) Date of Patent: May 7, 2019

(54) TIRE

(71) Applicant: BRIDGESTONE CORPORATION, Tokyo (JP)

(72) Inventors: Kento Hashimoto, Tokyo (JP); Akinori Oda, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 15/308,012

(22) PCT Filed: Apr. 24, 2015

(86) PCT No.: PCT/JP2015/062542
§ 371 (c)(1),
(2) Date: Oct. 31, 2016

(87) PCT Pub. No.: WO2015/170615
PCT Pub. Date: Nov. 12, 2015

(65) Prior Publication Data
US 2017/0050469 A1 Feb. 23, 2017

(30) Foreign Application Priority Data
May 8, 2014 (JP) ................................. 2014-096824

(51) Int. Cl.
B60C 11/00 (2006.01)

(52) U.S. Cl.
CPC ............ B60C 11/005 (2013.01); B60C 11/00 (2013.01); B60C 11/0008 (2013.01);
(Continued)

(58) Field of Classification Search
CPC ... B60C 11/00; B60C 11/005; B60C 11/0008; B60C 11/0025; B60C 11/0033
See application file for complete search history.

(56) References Cited

U.S. PATENT DOCUMENTS 4,381,810 A * 5/1983 Cady ..................... B60C 1/0016
152/209.5
4,444,236 A * 4/1984 Kan ....................... B60C 1/0016
152/209.5
(Continued)

FOREIGN PATENT DOCUMENTS

CN 103042885 A 4/2013
CN 103269881 A 8/2013
(Continued)

OTHER PUBLICATIONS

Of Blow, C.M. Rubber Technology and Manufacture, Published by Institution of the Rubber Industry 1971. pp. 320-321 (Year: 1971).*
(Continued)

Primary Examiner — Jodi C Franklin
(74) Attorney, Agent, or Firm — Oliff PLC

(57) ABSTRACT

A tire in which a reinforcement layer and a tread section are laminated in this order from the inside toward the outside in a radial direction of the tire. The tread section includes an inner base layer, an outer base layer, and a cap layer that are laminated in this order from the inside toward the outside in the radial direction of the tire. The cap layer is made of a material of which a modulus of elasticity and a loss tangent are lower than those of a material of the outer base layer. The inner base layer is made of a material of which a modulus of elasticity is lower than that of a material of the cap layer.

6 Claims, 2 Drawing Sheets

(52) U.S. Cl.
CPC ............ *B60C 2011/0025* (2013.01); *B60C 2011/0033* (2013.01); *Y02T 10/862* (2013.01)

(56) References Cited

U.S. PATENT DOCUMENTS

| | | | | |
|---|---|---|---|---|
| 4,580,608 | A * | 4/1986 | Rampl | B60C 1/0016 152/209.5 |
| 5,176,765 | A * | 1/1993 | Yamaguchi | B60C 1/0016 152/209.22 |
| 6,095,217 | A * | 8/2000 | Nakamura | B60C 1/0016 152/209.18 |
| 8,844,595 | B2 * | 9/2014 | Collette | B60C 11/005 152/209.18 |
| 2004/0050469 | A1 * | 3/2004 | Sandstrom | B60C 1/0016 152/209.5 |
| 2004/0118495 | A1 * | 6/2004 | Sandstrom | B60C 1/0016 152/209.5 |
| 2006/0048874 | A1 * | 3/2006 | Maruoka | B29D 30/3028 152/209.5 |
| 2007/0261773 | A1 * | 11/2007 | Onuma | B60C 11/00 152/454 |
| 2010/0018618 | A1 * | 1/2010 | Moorhead | B60C 11/00 152/209.5 |
| 2010/0059156 | A1 * | 3/2010 | Cambron | B60C 11/00 152/209.5 |
| 2012/0118462 | A1 * | 5/2012 | Segawa | B60C 11/00 152/450 |
| 2012/0234442 | A1 * | 9/2012 | Mayni | B60C 11/005 152/209.5 |
| 2012/0308793 | A1 * | 12/2012 | Kimura | B60C 1/0016 428/212 |
| 2013/0048169 | A1 * | 2/2013 | Erceg | B60C 11/0066 152/209.5 |
| 2013/0092302 | A1 | 4/2013 | Okabe | |
| 2013/0220500 | A1 * | 8/2013 | Okabe | B60C 11/0306 152/209.18 |
| 2013/0248075 | A1 | 9/2013 | Takahashi | |
| 2013/0276958 | A1 * | 10/2013 | Kanou | B60C 1/0016 156/135 |
| 2014/0345776 | A1 * | 11/2014 | Takada | B60C 11/01 152/538 |

FOREIGN PATENT DOCUMENTS

| | | | | |
|---|---|---|---|---|
| EP | 0543620 | A1 * | 5/1993 | ............ B60C 11/00 |
| EP | 0 715 974 | A1 | 6/1996 | |
| GB | 1255952 | * | 1/1968 | ............ B60C 11/18 |
| JP | 60061312 | A * | 4/1985 | |
| JP | 02303905 | A * | 12/1990 | |
| JP | 02303905 | A * | 12/1990 | ............ B60C 11/00 |
| JP | H02-303905 | A | 12/1990 | |
| JP | 2005-035404 | A | 2/2005 | |
| JP | 2005035404 | A * | 2/2005 | |
| JP | 2005-067236 | A | 3/2005 | |
| JP | 2006-062518 | A | 3/2006 | |
| JP | 2006-117050 | A | 5/2006 | |
| JP | 2007-196864 | A | 8/2007 | |
| JP | 2010-215115 | A | 9/2010 | |
| JP | 4827496 | B2 | 11/2011 | |
| JP | 2013-184330 | A | 9/2013 | |
| JP | 2013184330 | A * | 9/2013 | |
| WO | WO-2012141158 | A1 * | 10/2012 | ............ B60C 11/00 |
| WO | WO-2014005927 | A1 * | 1/2014 | ........ B60C 11/0058 |

OTHER PUBLICATIONS

Mark, James et al. Science and Technology of Rubber. Second Edition Published by Academic Press 1978 pp. 434-435 (Year: 1978).*

Apr. 3, 2017 extended European Search Report issued in European Patent Application No. 15789273.8.

Jul. 17, 2017 Search Report from Office Action issued in Chinese Patent Application No. 201580022300.2.

* cited by examiner

TIRE

TECHNICAL FIELD

The present invention relates to a tire.

Priority is claimed on Japanese Patent Application No. 2014-096824, filed on May 8, 2014, the content of which is incorporated herein by reference.

BACKGROUND ART

Generally, there has been known a tire in which a reinforcement layer and a tread section are laminated, in this order, from the inside toward the outside in a radial direction of the tire and the tread section includes a base layer and a cap layer laminated, in this order, from the inside toward the outside in the radial direction of the tire as described in, for example, the following Patent Document 1.

CITATION LIST

Patent Document

[Patent Document 1] Japanese Patent No. 4827496

SUMMARY OF INVENTION

Technical Problem

However, the tire in the related art has had a problem that it is difficult for rolling resistance performance to be improved while both ice/snow performance and steering stability performance are maintained which are contradictory to each other.

The invention has been made in consideration of the above-mentioned circumstances, and an object of the invention is to provide a tire that can improve rolling resistance performance while making both ice/snow performance and steering stability performance, which are opposite to each other, compatible with each other and maintaining the both ice/snow performance and the steering stability performance.

Solution to Problem

To solve the problem and to achieve the object, the invention provides a tire in which a reinforcement layer and a tread section are laminated in this order from the inside toward the outside in a radial direction of the tire. The tread section includes an inner base layer, an outer base layer, and a cap layer that are laminated, in this order, from the inside toward the outside in the radial direction of the tire. The cap layer is made of a material of which a modulus of elasticity and a loss tangent are lower than those of a material of the outer base layer. The inner base layer is made of a material of which a modulus of elasticity is lower than that of a material of the cap layer.

Advantageous Effects of Invention

According to the tire of the invention, rolling resistance performance can be improved while both ice/snow performance and steering stability performance are maintained which are contradictory to each other.

DESCRIPTION OF EMBODIMENTS

Figure 1:
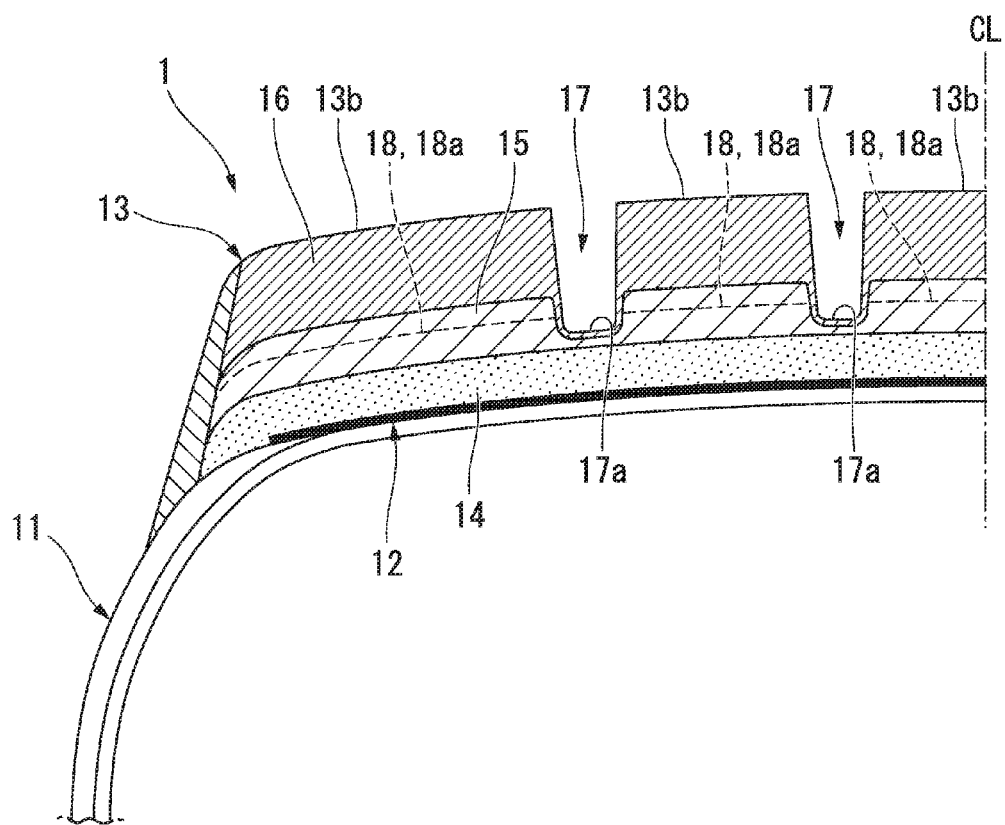
FIG. 1 is a longitudinal sectional view that is taken along a width direction of a tire according to an embodiment of the invention and shows part of the tire.

A tire 1 according to an embodiment of the invention will be described below with reference to FIG. 1.

The tire 1 has a structure in which a reinforcement layer 12 and a tread section 13 are laminated in this order on the outer peripheral surface of a carcass 11 from the inside toward the outside in a radial direction of the tire. In FIG. 1, CL denotes an equatorial portion of the tire.

Examples of the reinforcement layer 12 include a single-layer structure or a multilayer structure formed of, for example, a belt layer, a spiral layer, and the like.

The tread section 13 has a structure in which an inner base layer 14, an outer base layer 15, and a cap layer 16 are laminated, in this order, from the inside toward the outside in the radial direction of the tire. In an example shown in FIG. 1, the inner base layer 14 covers the entire reinforcement layer 12 from the outside in the radial direction of the tire and is in contact with the reinforcement layer 12. Further, both end portions of the inner base layer 14 in a width direction of the tire protrude from the reinforcement layer 12 to the outside in the width direction of the tire.

A tread under cushion may be disposed between the tread section 13 and the reinforcement layer 12 so that the inner base layer 14 is in contact with the reinforcement layer 12 with the tread under cushion interposed therebetween.

A plurality of grooves 17 and 18 are formed on the outer peripheral surface of the tread section 13. The plurality of grooves 17 and 18 include major grooves 17 that divide block portions 13b and sipes 18 that are formed on the outer peripheral surfaces of the block portions 13b.

The inner base layer 14 is positioned far from bottoms 17a and 18a of the grooves 17 and 18 toward the inside in the radial direction of the tire. The bottoms 17a and 18a of the grooves 17 and 18 are positioned in the outer base layer 15.

The thickness of the outer base layer 15 is smaller than the thickness of the cap layer 16. Further, the thickness of the inner base layer 14 is smaller than the thickness of each of the outer base layer 15 and the cap layer 16. That is, in the example shown in FIG. 1, the thickness of the inner base layer 14 is smallest and the thickness of the cap layer 16 is largest in the tread section 13.

For example, the thickness of the inner base layer 14 is set to about 0.6 times or less the thickness of the cap layer 16, and the thickness of the outer base layer 15 is set to about a quarter or more of the thickness of the cap layer 16. Furthermore, for example, the sum of the thickness of the inner base layer 14 and the thickness of the outer base layer 15 is set in the range of 0.4 to 1.6 times the thickness of the cap layer 16. In any case, the thickness of the tread section 13 is maintained equal to the thickness of the current tread section 13.

The thickness of each of the inner base layer 14, the outer base layer 15, and the cap layer 16 having been described above means the thickness of the thickest portion of each of the layers 14 to 16.

The cap layer 16 is made of a material of which the modulus of elasticity and the loss tangent are lower than those of the material of the outer base layer 15.

The inner base layer 14 is made of a material of which the modulus of elasticity and the loss tangent are lower than those of the material of the cap layer 16.

For example, the modulus of elasticity of the material of the inner base layer 14 is set in the range of 0.1 to 0.95 times the modulus of elasticity of the material of the cap layer 16 and is set in the range of 0.2 to 0.5 times the modulus of elasticity of the material of the outer base layer 15. Further, the loss tangent of the material of the inner base layer 14 is set in the range of 0.2 to 0.7 times the loss tangent of the material of the cap layer 16 and is set in the range of 0.2 to 0.5 times the loss tangent of the material of the outer base layer 15.

According to the tire 1 of this embodiment, as described above, among three layers of the tread section 13, that is, the inner base layer 14, the outer base layer 15, and the cap layer 16, the inner base layer 14, which is positioned farthest from the outer peripheral surface being in contact with the ground, is made of a material of which the modulus of elasticity is lower than the modulus of elasticity of each of the materials of the outer base layer 15 and the cap layer 16 that are the other two layers. Accordingly, since the inner base layer 14 is disposed between the reinforcement layer 12 and the outer base layer 15 having a high modulus of elasticity and the inner base layer 14 can be actively distorted, the distortion of the outer base layer 15 and the cap layer 16, which are the other two layers positioned closer to the outside than the inner base layer 14 in the radial direction of the tire, is suppressed. As a result, the rolling resistance performance of the tire 1 can be improved.

In addition, among three layers of the tread section 13, that is, the inner base layer 14, the outer base layer 15, and the cap layer 16, the loss tangent of the material of the cap layer 16, which is positioned on the outermost side in the radial direction of the tire, is lower than the loss tangent of the material of the outer base layer 15. Accordingly, the rolling resistance performance of the tire 1 is more reliably improved.

Further, since the modulus of elasticity of the material of the cap layer 16 is lower than the modulus of elasticity of the material of the outer base layer 15 that is positioned closer to the inside than the cap layer 16 in the radial direction of the tire, excellent ice/snow performance can be exhibited when the outer peripheral surface side of the tread section 13 is made to be flexible.

On the other hand, since the modulus of elasticity of the material of the outer base layer 15 is higher than the modulus of elasticity of the material of the cap layer 16 positioned closer to the outside than the outer base layer 15 in the radial direction of the tire, the stiffness of all the respective block portions 13b formed on the outer peripheral surface of the tread section 13 is ensured. Accordingly, steering stability performance can be maintained.

Furthermore, since the inner base layer 14 is made of a material of which the loss tangent is lower than that of each of the materials of the outer base layer 15 and the cap layer 16, the heat generated from the inner base layer 14 can be suppressed even though the inner base layer 14 is easily distorted among three layers of the tread section 13, that is, the inner base layer 14, the outer base layer 15, and the cap layer 16 as described above. Accordingly, rolling resistance performance can be reliably improved.

Moreover, among three layers of the tread section 13, that is, the inner base layer 14, the outer base layer 15, and the cap layer 16, the thickness of the inner base layer 14, which is easily distorted as described above, is smaller than the thickness of each of the outer base layer 15 and the cap layer 16. Accordingly, since the inner base layer 14, among three layers, that is, the inner base layer 14, the outer base layer 15, and the cap layer 16, is positioned farthest from the outer peripheral surface being in contact with the ground and the tread section 13 includes the inner base layer 14, it is possible to prevent the deterioration of steering stability performance that is caused by the reduction of the stiffness of the entire tread section 13.

Further, since the thickness of the outer base layer 15 is smaller than the thickness of the cap layer 16, the ice/snow performance of the cap layer 16 and the steering stability performance achieved by the stiffness of the outer base layer 15 can be mutually exhibited. Accordingly, ice/snow performance and the steering stability performance can be reliably made to be compatible with each other.

Furthermore, since the inner base layer 14 is positioned far from bottoms 17a and 18a of the grooves 17 and 18 toward the inside in the radial direction of the tire, the exposure of the inner base layer 14 to the outer peripheral surface of the tread section 13 can be prevented, the above-mentioned functional effects are obtained, and the deterioration of brake performance and durability can be prevented.

Moreover, since the thickness of the tread section 13 is maintained equal to the thickness of the current tread section 13, the above-mentioned respective functional effects can be obtained without an increase in the total weight of the tire 1.

Next, tests for verifying the above-mentioned functional effects will be described.

Figure 2:
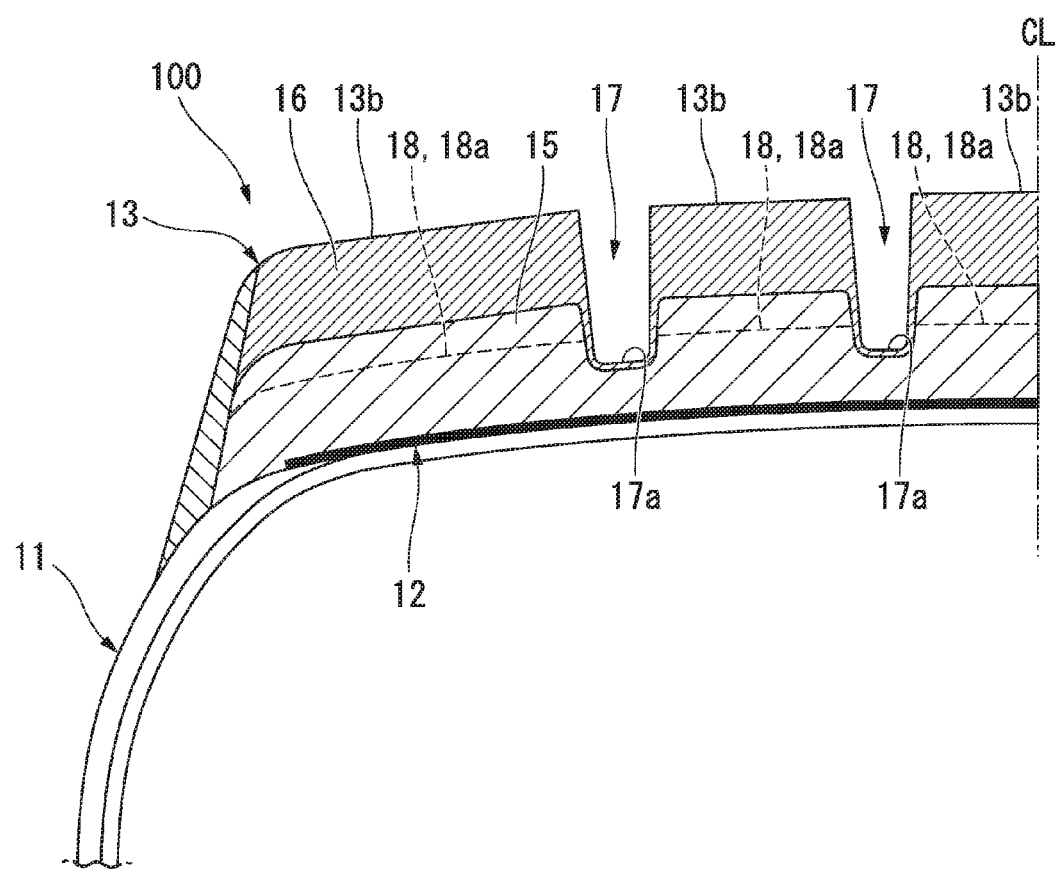
FIG. 2 is a longitudinal sectional view that is taken along a width direction of a tire in the related art according to the invention and shows part of the tire.

A tread section 13 of the tires 1 of Examples 1 to 3 employed a structure in which an inner base layer 14, an outer base layer 15, and a cap layer 16 are laminated in this order from the inside toward the outside in the radial direction of the tire as shown in FIG. 1; and a tread section 13 of a tire 100 in the related art employed a structure in which an outer base layer 15 and a cap layer 16 are laminated in this order from the inside toward the outside in the radial direction of the tire as shown in FIG. 2.

Then, the modulus of elasticity, the loss tangent, and the thickness of each of the inner base layers 14, the outer base layers 15, and the cap layers 16 of these four kinds of tires 1 and 100 were set as shown in Table 1. Further, the size of each of the four kinds of tires 1 and 100 was set to 195/65R15.

TABLE 1

|  |  | RELATED ART | EXAMPLE 1 | EXAMPLE 2 | EXAMPLE 3 |
| --- | --- | --- | --- | --- | --- |
| MODULUS OF ELASTICITY (MPa) | CAP LAYER | 9 | 9 | 9 | 9 |
|  | OUTER BASE LAYER | 30 | 30 | 30 | 30 |
|  | INNER BASE LAYER | — | 7 | 7 | 7 |
| LOSS TANGENT tanδ | CAP LAYER | 0.3 | 0.3 | 0.3 | 0.3 |
|  | OUTER BASE LAYER | 0.4 | 0.4 | 0.4 | 0.4 |
|  | INNER BASE | — | 0.2 | 0.1 | 0.1 |

TABLE 1-continued

| | | RELATED ART | EXAMPLE 1 | EXAMPLE 2 | EXAMPLE 3 |
|---|---|---|---|---|---|
| THICKNESS (mm) | CAP LAYER | 4.9 | 5 | 5 | 5 |
| | OUTER BASE LAYER | 5.9 | 3 | 3 | 4 |
| | INNER BASE LAYER | — | 3 | 3 | 2 |
| EVALUATION (index) | ICE/SNOW PERFORMANCE | 100 | 100 | 100 | 100 |
| | STEERING STABILITY PERFORMANCE | 100 | 100 | 100 | 100 |
| | ROLLING RESISTANCE PERFORMANCE | 100 | 95 | 90 | 89 |

In regard to a modulus of elasticity and a loss tangent (tan δ), the loss tangent (tan δ) was measured under a condition, in which the initial strain was 2%, the dynamic strain was 1%, and a frequency was 52 Hz, by using a spectrometer, which is manufactured by Ueshima Seisakusho Co., Ltd., while a dynamic tensile storage modulus E' at 30° C. was used as the modulus of elasticity.

A larger numerical value of the modulus of elasticity means that elasticity is higher, and a larger numerical value of the loss tangent (tan δ) means that a larger amount of heat is generated.

Here, the measured modulus of elasticity is a dynamic tensile storage modulus E' measured by a dynamic tensile viscoelasticity test and a loss tangent (tan δ). However, the results of tests other than the above-mentioned test, for example, a dynamic compressive viscoelasticity test, a dynamic shear viscoelasticity test, and other dynamic viscoelasticity show the same tendency as the result of the dynamic tensile viscoelasticity test. Accordingly, all relationships between the modulus of elasticity and the loss tangent (tan δ) of a tire described in claim 1 of this application are satisfied in dynamic viscoelasticity tests under the measurement conditions or measurement conditions equivalent thereto.

The reason for this is that the tensile modulus of elasticity, the compressive modulus of elasticity, and the shear modulus of elasticity of rubber used for the tread section of the tire are proportional to each other since the Poisson's ratio of the rubber is close to 0.5 and a change in the volume of the rubber is very small even though the rubber is deformed.

Further, air pressure of 210 kPa was applied to each tire, each tire was mounted on a vehicle through an application rim 15×6J, and tests were performed for the evaluation of ice/snow performance and steering stability performance.

Ice/snow performance was evaluated by using an average value of a value obtained by expressing the measured value of a braking distance, which was obtained when the vehicle was subjected to full braking while driving straight along a test course on an ice road surface at a speed of 20 km/h, using an index in which the result of the tire in the related art was expressed as 100 and a value obtained by expressing the measured value of a braking distance, which was obtained when the vehicle was subjected to full braking while driving straight along a test course on a snow road surface at a speed of 40 km/h, using an index in which the result of the tire in the related art was expressed as 100.

In regard to steering stability performance, responsiveness and stability, which were obtained when the driving of the vehicle was switched to cornering during the straight driving of the vehicle along a test course on a dry road surface at a speed of 80 km/h, were evaluated by using an index, in which the result of the tire in the related art was expressed as 100, on the basis of driver's feeling.

In the above-mentioned two kinds of evaluation, a larger numerical value which is the evaluation of each performance means that each performance is more excellent.

In regard to rolling resistance performance, a value, which was measured under a condition, in which air pressure was 210 kPa, the test load was 4.82 kN, and the speed was 80 km/h, when an indoor drum tester was used and a force-type testing method was applied, was evaluated by using an index in which the result of the tire in the related art was expressed as 100.

In this evaluation, a smaller numerical value which is the evaluation of each performance means that performance is more excellent.

From the above-mentioned results, as shown in Table 1, it was confirmed that the rolling resistance performance of the tires 1 of Examples 1 to 3 can be improved in comparison with the rolling resistance performance of the tire 100 in the related art while ice/snow performance and steering stability performance were made to be compatible with each other and were maintained.

The technical scope of the invention is not limited to the embodiment, and the invention may include various modifications without departing from the scope of the invention.

For example, the inner base layer 14 has been made of a material in which the loss tangent is lower than that of the material of the cap layer 16 in the embodiment, but the inner base layer 14 may be made of a material of which the loss tangent is equal to or higher than that of the material of the cap layer 16.

Further, the thickness of the inner base layer 14 may be equal to or larger than the thickness of each of the outer base layer 15 and the cap layer 16.

Furthermore, the thickness of the outer base layer 15 may be equal to or larger than the thickness of the cap layer 16.

Moreover, the bottoms 17a and 18a of the grooves 17 and 18 may be positioned in the inner base layer 14.

Further, at least one of the outer base layer 15 and the cap layer 16 may be made of foam rubber.

Furthermore, the tread section 13 may include an outer layer that is disposed on the cap layer 16. This outer layer may be made of foam rubber, and may be made of an arbitrary material, such as a material of which the modulus of elasticity is lower than that of the material of the cap layer 16 or the material of the inner base layer 14.

Moreover, the components of the embodiment can be appropriately substituted with well-known components without departing from the scope of the invention, and the modification examples may be appropriately combined with each other.

INDUSTRIAL APPLICABILITY

According to the tire of the invention, rolling resistance performance can be improved while both ice/snow performance and steering stability performance are maintained which are contradictory to each other.

REFERENCE SIGNS LIST

1: tire
12: reinforcement layer
13: tread section
14: inner base layer
15: outer base layer
16: cap layer
17, 18: groove
17a, 18a: bottom

The invention claimed is:

1. A tire in which a reinforcement layer and a tread section are laminated in this order from the inside toward the outside in a radial direction of the tire,
   wherein the tread section includes an inner base layer, an outer base layer, and a cap layer that are laminated in this order from the inside toward the outside in the radial direction of the tire,
   modulus of elasticity of a material of the inner base layer is set in a range of 0.1 to 0.95 times modulus of elasticity of a material of the cap layer and is set in a range of 0.2 to 0.5 times modulus of elasticity of a material of the outer base layer, and
   loss tangent of the material of the inner base layer is set in a range of 0.2 to 0.7 times loss tangent of the material of the cap layer and is set in a range of 0.2 to 0.5 times loss tangent of the material of the outer base layer; wherein the modulus of elasticity and loss tangent of the outer base layer are different than the modulus of elasticity and loss tangent of the cap layer.

2. The tire according to claim 1,
   wherein the thickness of the inner base layer is smaller than the thickness of each of the outer base layer and the cap layer.

3. The tire according to claim 2,
   wherein the thickness of the outer base layer is smaller than the thickness of the cap layer.

4. The tire according to claim 3,
   wherein grooves are formed on an outer peripheral surface of the tread section, and
   the inner base layer is positioned through the outer base layer on an inner side in the radial direction of the tire than a bottom of the grooves.

5. The tire according to claim 2,
   wherein grooves are formed on an outer peripheral surface of the tread section, and
   the inner base layer is positioned through the outer base layer on an inner side in the radial direction of the tire than a bottom of the grooves.

6. The tire according to claim 1,
   wherein grooves are formed on an outer peripheral surface of the tread section, and
   the inner base layer is positioned through the outer base layer on an inner side in the radial direction of the tire than a bottom of the grooves.

* * * * *